Aug. 26, 1941.  W. E. NAUGLER  2,253,644
EYELETING MACHINE
Filed Aug. 9, 1939  2 Sheets-Sheet 2
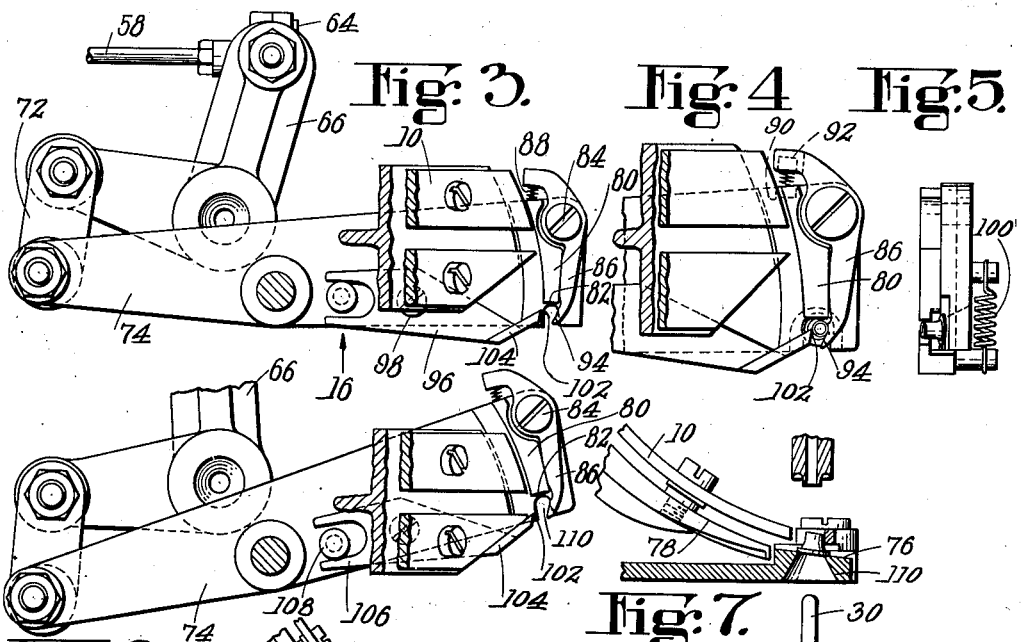
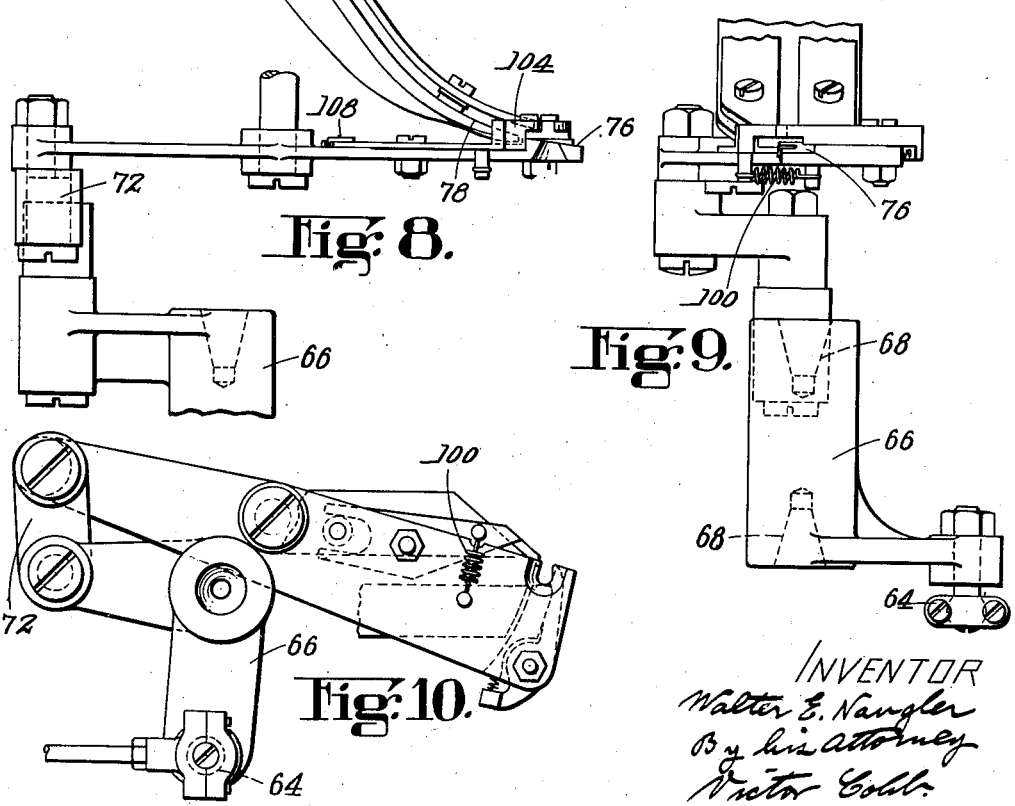
INVENTOR
Walter E. Naugler
By his attorney
Victor Cobb Patented Aug. 26, 1941

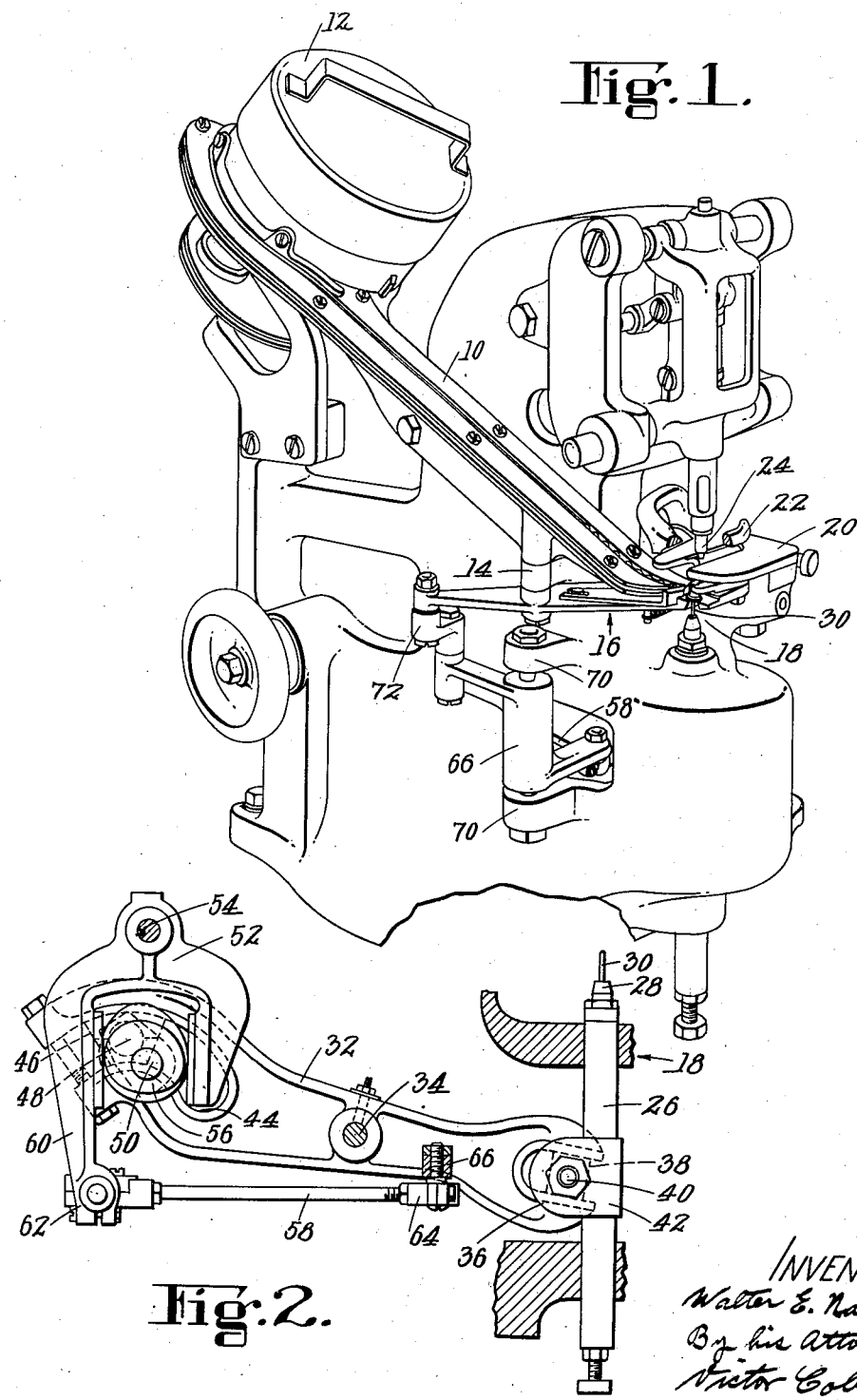

2,253,644

UNITED STATES PATENT OFFICE 2,253,644

EYELETING MACHINE

Walter E. Naugler, Beverly, Mass., assignor to United Shoe Machinery Corporation, Borough of Flemington, N. J., a corporation of New Jersey Application August 9, 1939, Serial No. 289,259

13 Claims. (Cl. 218—15)

This invention relates to eyeleting machines and more particularly to mechanism for feeding eyelets to the eyelet inserting tool of such a machine.

In a conventional type of eyeleting machine, such as is illustrated in United States Letters Patent No. 1,228,768, granted June 5, 1917 on an application in the name of P. R. Glass, a movable inclined raceway is provided for delivering eyelets to the eyelet inserting tool. This raceway is oscillated about a vertical axis extending through the upper rearward portion thereof and the delivery end of the raceway is rapidly moved into register with and away from the eyelet inserting tool. After movement of the delivery end of the raceway into register with the eyelet inserting tool, the tool moves into an eyelet. The delivery end of the raceway then moves away therefrom so that the eyelet which has been left on the tool may be inserted in the work without interference from the raceway.

This type of mechanism for transferring eyelets to the eyelet inserting tool has certain disadvantages which are overcome by the present invention. The movable raceway has a considerable mass and therefore a large amount of power is required to oscillate this raceway to transfer eyelets to the eyelet inserting tool. Moreover, the oscillation of the heavy raceway, which is often at the rate of 500 times per minute, produces a large amount of vibration and noise much of which is eliminated by the present invention. The eyelets are carried in the raceway for a considerable period of time before reaching the delivery end thereof and therefore are subjected to a large amount of vibration within the raceway as it is oscillated, since the eyelets fit somewhat loosely therein, with the result that if the eyelets are enameled, the enamel may become scratched or otherwise damaged by the time the eyelets have reached the end of the raceway and are ready to be delivered to the eyelet inserting tool.

In accordance with the present invention, the machine is equipped with a stationary inclined raceway in place of the usual movable raceway. A small transfer mechanism is provided for transferring the eyelets one at a time from the delivery end of the raceway to the eyelet inserting tool. This transfer mechanism, because of its relatively small size, requires less power to operate than is required to oscillate the usual movable raceway and the reciprocation of the small transfer device produces relatively little noise and vibration. Prior to the delivery of the eyelets to the transfer device, they slide down the raceway but are not subjected to the agitation that takes place in a rapidly oscillating raceway so that there is much less danger of damage to the enamel or surface of the eyelets.

In accordance with one feature of the invention, the transfer mechanism includes a plurality of jaws arranged to grip the barrel of an eyelet at widely separated points to insure accurate positioning of the eyelet therein so that it will be delivered into proper alinement with the eyelet-inserting mechanism.

In the illustrated embodiment of the invention, the transfer mechanism is provided with a plurality of jaws between which an eyelet is held against accidental displacement, and one of these jaws is automatically retracted when the transfer mechanism moves to the delivery end of the raceway. The movement of this jaw permits an eyelet to move from the raceway into engagement with the other jaws of the transfer mechanism. As soon as the transfer mechanism moves away from the delivery end of the raceway toward the eyelet inserting tool, this retractable jaw moves to a position in which it maintains the eyelet in engagement with the other jaws of the transfer mechanism. After the transfer mechanism moves over the eyelet inserting tool, the spindle thereof moves through the eyelet carried by the transfer mechanism and the transfer mechanism then moves away from the spindle leaving the eyelet thereon. Removal of the eyelet from the transfer mechanism is permitted by reason of the aforementioned retractable jaw and a second retractable jaw cooperating therewith, this latter jaw being adapted to engage an eyelet throughout a considerable portion of its periphery. The transfer mechanism includes a gate member which closes the delivery end of the raceway except when the transfer mechanism is in a position to receive an eyelet therefrom.

In the drawings illustrating a preferred form of the invention,

Fig. 1 is a perspective view of an eyeleting machine illustrating the stationary raceway, the movable transfer mechanism, and the eyelet inserting tool;

Fig. 2 is a view illustrating the trains of mechanisms for operating the eyelet inserting tool and the transfer mechanism.

Fig. 3 is a top plan view of the transfer mechanism and the delivery end of the raceway with the transfer mechanism in a position to deliver an eyelet to the eyelet inserting tool;

Fig. 4 is an enlarged view of the delivery end of the raceway and the transfer mechanism, this view showing the parts in the same position as in Fig. 3 but showing an eyelet held by the transfer mechanism;

Fig. 5 is a front elevation of the transfer mechanism with the outer eyelet engaging jaw removed therefrom;

Fig. 6 is a view similar to Fig. 3 but with the transfer mechanism in a position to receive an eyelet from the delivery end of the raceway;

Fig. 7 is a vertical section through the transfer mechanism and illustrating its relationship to the raceway, the eyelet inserting tool, and the punching and upsetting tool;

Fig. 8 is a side elevation of the transfer mechanism, the operating mechanism therefor, and the delivery end of the raceway;

Fig. 9 is a front elevation of the parts shown in Fig. 8, and

Fig. 10 is a bottom view of the transfer mechanism in the eyelet receiving position.

As shown in Fig. 1 the machine comprises a stationary raceway 10 with the upper end of which is associated a magazine 12 for delivering eyelets to the raceway. Located adjacent to the delivery end of the raceway and pivotally mounted on a bracket 14 of the machine is a transfer mechanism 16 for transferring eyelets one at a time from the delivery end of the raceway 10 to an eyelet inserting mechanism 18. A work supporting table 20 is provided for supporting the work into which the eyelets are to be inserted and a presser foot 22, mounted above the table 20, maintains the work in engagement with the table. A punching and upsetting tool 24 is mounted above the table and is arranged to punch the eyelet receiving holes in the material, to feed the material to the eyelet inserting tool, and in cooperation with this tool to upset and clinch the eyelet inserted therein. The particular mechanism for operating this punching and upsetting tool forms no part of the present invention but may be constructed in accordance with the aforementioned Glass patent.

The trains of mechanisms for operating the eyelet inserting tool and the transfer mechanism are illustrated in detail in Fig. 2. The eyelet inserting mechanism 18 includes a vertically movable bar 26, an eyelet inserting tool 28 adjustably secured thereto, and a spring pressed spindle 30 of well-known construction for picking an eyelet from the transfer mechanism. A lever 32 fulcrumed at 34 to the frame of the machine is forked at 36 to receive a block 38 mounted on a stud 40. The stud 40 is mounted in a bracket 42 which is suitably fastened to the vertical bar 26 so that as the lever 32 moves about its fulcrum 34, the bar 26 will be moved vertically. The opposite end of the lever 32 has formed therein a cam slot 44 in which is received a two-part block 46 connected to a crank 48 which may be formed as an integral part of a cam shaft 50. The block 46 is made of two parts to facilitate assembly thereof. As the cam shaft 50 rotates in a clockwise direction, the lever 32 will be moved thereby in a clockwise direction through a short distance or until crank 48 moves in a vertical plane through the axis of the cam shaft 50. Upon further movement of the crank 48, the lever 32 will be moved in a counterclockwise direction to move the eyelet inserting mechanism upwardly.

A forked lever 52 is fulcrumed to the frame of the machine at 54 and a conjugate cam 56 carried by the cam shaft 50 is mounted between the adjacent faces of the forked portions of the lever for causing oscillation thereof as the cam 56 rotates. A rod 58 is connected to the lower end of an extension 60 of one of the forked portions of the lever 52 by means of a universal joint 62 and the other end of this rod is connected to a universal joint 64.

A bell crank lever 66 (Figs. 1, 3, 6, and 8 to 10) is connected to the universal joint 64 and is journaled to the frame of the machine. For this purpose the bell crank lever is provided with tapered bearing surfaces 68 (Fig. 9) for receiving correspondingly shaped trunnions adjustably mounted in brackets 70 of the machine (Fig. 1). The other arm of the bell crank lever is pivotally connected to a link 72 which is in turn connected to one end of the transfer mechanism 16. It will now be apparent that as the rod 58 is moved toward the right (Fig. 2) the bell crank lever 66 will be moved in a clockwise direction from the position shown in Fig. 6 to the position shown in Fig. 3 thus causing movement of the transfer mechanism in a clockwise direction as viewed in these figures.

With the trains of mechanisms in the positions illustrated in Fig. 2, the eyelet inserting mechanism is near its lowermost position and the rod 58 is in its extreme left position. As the cam shaft 50 rotates in a clockwise direction, the eyelet inserting mechanism will move downwardly a slight amount and then begin its upward movement and the rod 58 will simultaneously move toward the right thus causing movement of the transfer mechanism 16 from the position shown in Fig. 6 to the position shown in Fig. 3.

Referring now to Figs. 3 to 10, the transfer mechanism will be described in detail. This transfer mechanism comprises a pivoted supporting arm 74 having adjacent to its outer end an inclined surface 76 for supporting an eyelet to be transferred. When the transfer mechanism is in a position to receive an eyelet from the raceway, as in Figs. 6 and 7, the inclined surface 76 forms a continuation of the inclined surface 78 of the raceway on which the eyelets are supported, so that the eyelets may slide from the raceway onto the surface 76. A gate member 80 is formed near the outer end of the arm 74 and is arranged to close the delivery end of the raceway 10 upon movement of the arm 74 from the position shown in Fig. 6 to the position shown in Fig. 3 or, in other words, when the transfer mechanism transfers an eyelet from the delivery end of the raceway to the eyelet inserting device. The forward edge 82 of the gate member 80 forms an abutment or jaw against which an eyelet carried by the transfer mechanism is maintained.

Pivotally supported on the outer end of the arm 74 about a pivot screw 84 is a retractable jaw 86 which is biased in a clockwise direction by means of a spring 88. One end of the spring 88 seats in a recess 90 (Fig. 4) formed in an edge of the arm 74, the other end of the spring being seated in a recess 92 in an angular extension of the jaw 86. Movement of the jaw 86 in a clockwise direction is limited by the outer surface of the gate member 80. The gripping surface 94 of the jaw 86 is curved so that it may engage an eyelet throughout a substantial portion of its periphery as illustrated in Fig. 4.

The arm 74 also carries a second movable jaw 96 which is pivoted about a fulcrum pin 98 and is biased in a counterclockwise direction as viewed in Figs. 3 and 6 by means of a spring 100. This jaw has a sharp eyelet engaging surface 102 and is arranged to engage an eyelet at a position substantially opposite the gripping surface 94 of the jaw 86 as shown in Fig. 4. The jaw portion 104 of the member 96 extends upwardly as shown in Fig. 8 and is arranged to engage the raceway when the arm 74 is moved to the position shown in Fig. 6 to move the jaw member 96 in a clockwise direction against the action of the spring 100. This movement of the jaw member 96 permits movement of an eyelet from the raceway onto the inclined supporting surface 76 between the jaws 82 and 86. As soon as the arm 74 moves in a clockwise direction, the spring 100 moves the jaw member 96 in a counterclockwise direction with respect to the arm 74 so that the surface 102 thereof will engage the eyelet and maintain the eyelet in engagement with the other jaws, as illustrated in Fig. 4, to prevent accidental displacement of the eyelet. The member 96 may be bifurcated as shown at 106 and a pin 108 carried by the arm 74 located between the forks of the bifurcated end to limit movement of the member 96 about its fulcrum 98.

The supporting surface 76 of the transfer mechanism is recessed at its forward edge, at 110, the sides of the recess sloping downwardly and outwardly as shown in Figs. 7 and 8, to facilitate movement of the eyelet inserting pin 30 therethrough to engage the eyelet which is being held by the aforedescribed jaws directly over the inner portion of the recess. The recess extends to the forward edge of the supporting surface so that the arm may move away from the eyelet inserting pin 30 after the pin has moved through the recess and through an eyelet supported thereon. This movement of the transfer mechanism away from the eyelet inserting pin and the eyelet through which the pin has moved is permitted by reason of the resilient mounting of the jaw 86, this jaw yielding to release its hold on the eyelet so that the eyelet may be readily removed from the transfer device. It will also be understood that the other pivotally mounted jaw 96 may also yield at this time, if necessary, to enable removal of the eyelet from the transfer mechanism.

With the parts in the positions illustrated in Fig. 1, the transfer device has moved from the delivery end of the raceway as shown in Fig. 6 to a position wherein the eyelet is located directly over the eyelet inserting pin 30. As the transfer mechanism moves from the position shown in Fig. 6, the gate 80 closes the delivery end of the raceway and the surface 102 of the movable jaw 96 is moved to the position of Fig. 4 in which it maintains the eyelet in engagement with the surfaces 82 and 94 of the jaws 80 and 86. Referring again to Fig. 1, the eyelet inserting pin 30 has just begun to enter the eyelet carried by the transfer mechanism and after this pin has moved entirely through the eyelet by the movement of the lever 32 of Fig. 2, the transfer mechanism will start to move back to the raceway by reason of the action of the conjugate cam 56 of Fig. 2 and upon this reverse movement of the transfer mechanism the movable jaw 86 moves outwardly with respect to the eyelet to release its hold thereon so that the eyelet is left on the eyelet inserting mechanism. The punching and upsetting member 24 is shown in Fig. 1 in the position it assumes after it has punched the material which is supported on the table 20 and held thereagainst by means of the presser foot 22, the punching device moving slightly upwardly after it has punched the material to carry its end out of engagement with the table and relieve the pressure of the machine so that feeding of the material by transverse movement of the punch 24 may take place. After the transfer mechanism moves back to the delivery end of the raceway the punching and upsetting member 24 is moved from the position of Fig. 1 to a position directly over the eyelet inserting member by mechanism such as shown in the Glass patent referred to above, and the punching device moves to its lowermost position as the eyelet is moved to it by the eyelet inserting tool so as to be upset and held firmly in the material. The punching member 24 then moves upwardly and transversely to the vertical position shown in Fig. 1 and the eyelet inserting tool is retracted at the end of the cycle of operation.

It will be noted that the jaws 82, 86, and 96 grip the barrel of the eyelet at three widely separated points, the jaws 86 and 96 maintaining the barrel of the eyelet against the jaw 82, which is fixed relative to the transfer mechanism. Thus, the eyelet is accurately positioned in the transfer mechanism for delivery into proper alinement with the eyelet-inserting pin 30.

With the arrangement illustrated, the same general cycle of operation takes place as in prior machines but the raceway is held stationary and it is necessary to move only the relatively small transfer mechanism for transferring the eyelets from the delivery end of the raceway to the eyelet inserting tool, thus reducing the power necessary to operate the machine as well as reducing noise and vibration. The eyelets are not constantly agitated as they move down the raceway as they are in machines in which the raceway is rapidly reciprocated so that there is less likelihood of scratching or otherwise damaging the surface of the flange of the eyelets.

Having thus described my invention, what I claim as new and desire to secure by Letters Patent of the United States is:

1. In an eyelet inserting machine, an eyelet inserting tool, a stationary inclined raceway for supporting a plurality of eyelets, mechanism for transferring the eyelets one at a time from said raceway to said tool, said transferring mechanism comprising three jaws between which an eyelet may be held, two of said jaws being yieldingly mounted with respect to the third jaw and biased toward each other and toward the third jaw, means for moving said tool into an eyelet held by said transferring mechanism, and means for then moving the transferring mechanism back to said raceway, removal of the eyelet from the transferring mechanism being permitted by reason of the yielding mounting of said two of said jaws.

2. In an eyelet inserting machine, an eyelet inserting tool, a stationary inclined raceway for supporting a plurality of eyelets, mechanism for transferring eyelets one at a time from said raceway to said tool, said transferring mechanism comprising three jaws between which an eyelet may be held, two of said jaws being yieldingly mounted and being biased toward each other and toward the third jaw, means cooperating with one of said movable jaws for holding the same in retracted position when said transferring mechanism is in a position to receive an eyelet from the raceway to permit movement of the eyelet into the space between the three jaws, said jaw moving into engagement with the eyelet upon movement of the transferring mechanism away from said inclined raceway and to said tool to prevent accidental removal of the eyelet therefrom, means for moving said tool into an eyelet held by said transferring mechanism, and means for then moving the transferring mechanism back to said raceway.

3. In an eyelet inserting machine, an eyelet inserting tool, a stationary inclined raceway, mechanism for transferring eyelets one at a time from said raceway to said tool, said transferring mechanism comprising a plurality of jaws at least one of which is retractible to permit movement of an eyelet into said transferring mechanism, means biasing said retractible jaw toward the other jaws to prevent accidental removal of an eyelet from said transferring mechanism, said retractible jaw being arranged to engage the end of said raceway and to be retracted thereby when said transferring mechanism is in position to receive an eyelet from said raceway.

4. In an eyelet inserting machine, an eyelet inserting tool, a stationary inclined raceway for supporting a plurality of eyelets, mechanism for transferring eyelets one at a time from said raceway to said tool, said transferring mechanism comprising a plurality of jaws for gripping an eyelet delivered thereto, at least one of said jaws being retractible to permit movement of an eyelet into said transferring mechanism, means biasing said retractible jaw toward the other jaws, and means associated with said transferring mechanism to prevent movement of eyelets from said raceway when said transferring mechanism has moved away therefrom.

5. In an eyelet inserting machine, a stationary inclined raceway for supporting a plurality of eyelets, a reciprocable carrier movable in a path transverse to the delivery end of said raceway, said carrier having a plurality of eyelet gripping jaws, one of said jaws being movable and arranged to be retracted upon movement of the carrier to a position in register with the delivery end of said raceway to permit movement of an eyelet into said carrier, and means for moving said jaw, upon movement of said carrier away from said position, to a position in which it cooperates with the other jaws to prevent accidental removal of an eyelet therefrom.

6. In an eyelet inserting machine, a stationary inclined raceway for supporting a plurality of eyelets, a reciprocable carrier movable in a path transverse to the delivery end of said raceway, said carrier having a plurality of eyelet gripping jaws, one of said jaws being located opposite the delivery end of said raceway and curved to engage an eyelet throughout a substantial portion of its periphery, another of said jaws being movable and arranged to be retracted upon movement of the carrier to a position in register with the delivery end of said raceway to permit movement of an eyelet into said carrier, and means for moving said jaw, upon movement of said carrier away from said position, to a position in which it cooperates with the other jaws to prevent accidental removal of an eyelet therefrom.

7. In an eyelet inserting machine, a stationary inclined raceway for supporting a plurality of eyelets, a reciprocable carrier movable in a path transverse to the delivery end of said raceway, said carrier having a plurality of eyelet gripping jaws, one of said jaws being located opposite the delivery end of said raceway and curved to engage an eyelet throughout a substantial portion of its periphery, said jaw being retractible to facilitate removal of an eyelet therefrom, another of said jaws being movable and arranged to be retracted upon movement of the carrier to a position in register with the delivery end of the raceway to permit movement of an eyelet into engagement with said curved jaw, and means for moving said last-named jaw to a position in which it cooperates with the other jaws to prevent accidental displacement of an eyelet therefrom upon movement of said carrier away from said position.

8. In an eyelet inserting machine, a stationary inclined raceway for supporting a plurality of eyelets, a reciprocable carrier movable in a path transverse to the delivery end of said raceway, said carrier having a plurality of eyelet gripping jaws, one of said jaws being located opposite the delivery end of said raceway and curved to engage an eyelet throughout a substantial portion of its periphery, said jaw being retractible to facilitate removal of an eyelet therefrom, another of said jaws being movable and arranged to be retracted upon movement of the carrier to a position in register with the delivery end of the raceway to permit movement of an eyelet into engagement with said curved jaw, and means for moving said last-named jaw to a position in which it cooperates with the other jaws to prevent accidental displacement of an eyelet therefrom upon movement of said carrier away from said position, said carrier also including means for preventing movement of eyelets from said raceway when said carrier is moved out of register with the delivery end of said raceway.

9. In an eyelet inserting machine, a stationary inclined raceway for supporting a plurality of eyelets, a reciprocable carrier movable in a path transverse to the delivery end of said raceway, said carrier including a plurality of jaws between which an eyelet is gripped and supported, one of said jaws being fixed with respect to the carrier and lying behind an eyelet with respect to the direction of movement of said carrier, a second of said jaws being located opposite the delivery end of said raceway and curved to engage an eyelet throughout a substantial portion of its periphery, said jaw being retractible in a direction away from the delivery end of said raceway to facilitate removal of an eyelet from said carrier, a third of said jaws being located substantially opposite the second of said jaws and arranged to be retracted upon movement of the carrier to a position in register with the delivery end of the raceway to permit movement of an eyelet into engagement with the first and second of said jaws, and means for moving said last-named jaw into engagement with the portion of the eyelet opposite said second-named jaw whereby the eyelet is held by said carrier against accidental displacement therefrom upon movement of said carrier away from said position.

10. In an eyelet inserting machine, a stationary inclined raceway for supporting a plurality of eyelets, a reciprocable carrier movable in a path transverse to the delivery end of said raceway, said carrier including a member for preventing movement of eyelets from said raceway except when said carrier is in one extreme position, said member terminating at one edge of said raceway when said carrier is in said extreme position and forming an abutment for an eyelet which has moved from the raceway into the carrier, said carrier including a movable jaw having a curved portion arranged to grip an eyelet throughout a substantial portion of its periphery, said movable jaw being located opposite the delivery end of said raceway and being biased toward said raceway, said carrier also including another movable jaw, said other movable jaw being located opposite said first-named movable jaw for holding an eyelet between said jaws and in engagement with said abutment, said other movable jaw cooperating with the delivery end of said raceway whereby it is retracted upon movement of the carrier to said extreme position for permitting movement of an eyelet into engagement with said first-named movable jaw and said abutment, and means for moving said other of said movable jaws, upon movement of said carrier away from said position, to a position in which it cooperates with the other jaw and said abutment to prevent accidental removal of an eyelet therefrom.

11. In an eyelet inserting machine, a stationary inclined raceway for supporting a plurality of eyelets, a reciprocable carrier movable in a path transverse to the delivery end of said raceway, said carrier comprising a supporting plate having an inclined supporting surface forming a continuation of the lower end of said raceway, whereby an eyelet may move by gravity from said raceway onto said supporting plate, said supporting plate having a recess in an edge thereof, a plurality of eyelet holding jaws arranged to yieldingly maintain an eyelet on said plate over said recess, an eyelet inserting tool, means for moving said eyelet inserting tool through said recess and through an eyelet supported thereby when said carrier has moved away from the delivery end of said raceway, at least one of said jaws being yieldable to permit removal of an eyelet therefrom, and means for preventing movement of the eyelets from said raceway except when said carrier is in a position to receive the eyelets therefrom.

12. In an eyelet-inserting machine, an eyelet-inserting tool, a stationary inclined raceway for supporting a plurality of eyelets for delivery therefrom, mechanism for transferring eyelets one at a time from said raceway to said tool, said transferring mechanism comprising three eyelet-engaging members arranged to grip the periphery of an eyelet barrel at three widely spaced points, one of said eyelet-engaging members comprising a yieldable jaw arranged to maintain the eyelet in engagement with the other two of said eyelet-engaging members while permitting the removal of the eyelet from said transferring mechanism, means for moving said tool into an eyelet held by said gripping means, and means for then moving the transferring mechanism away from said tool and eyelet.

13. In an eyeleting machine, an eyelet-inserting tool, a raceway arranged to supply eyelets, and reciprocatory means movable widthwise of the raceway to transfer an eyelet from the raceway to said tool, said means comprising two spring-biased members arranged to grip the periphery of an eyelet barrel, one of said spring-biased members being displaceable widthwise of the raceway to receive an eyelet, and the other being arranged to arrest the eyelet so received but upon displacement of said other member to permit subsequent removal of the eyelet by said tool.

WALTER E. NAUGLER.